Figure 1:
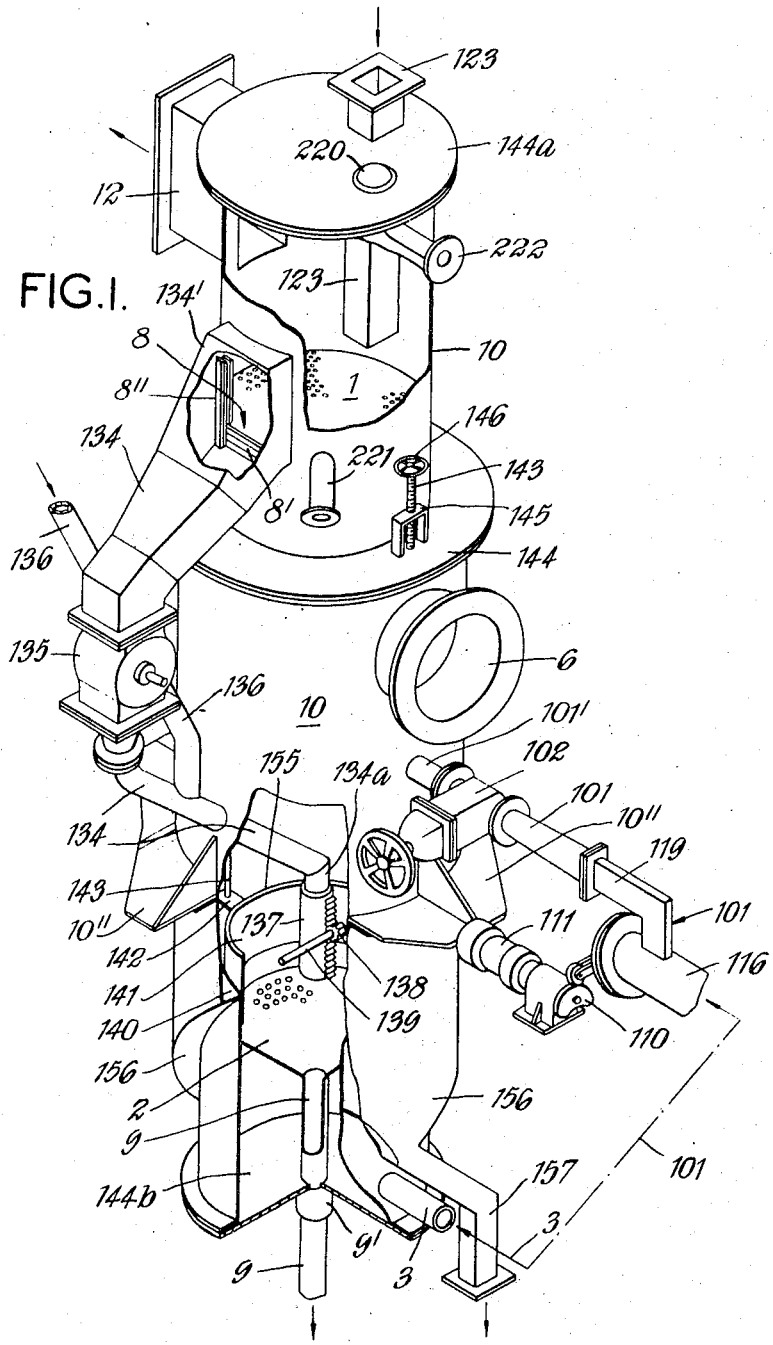

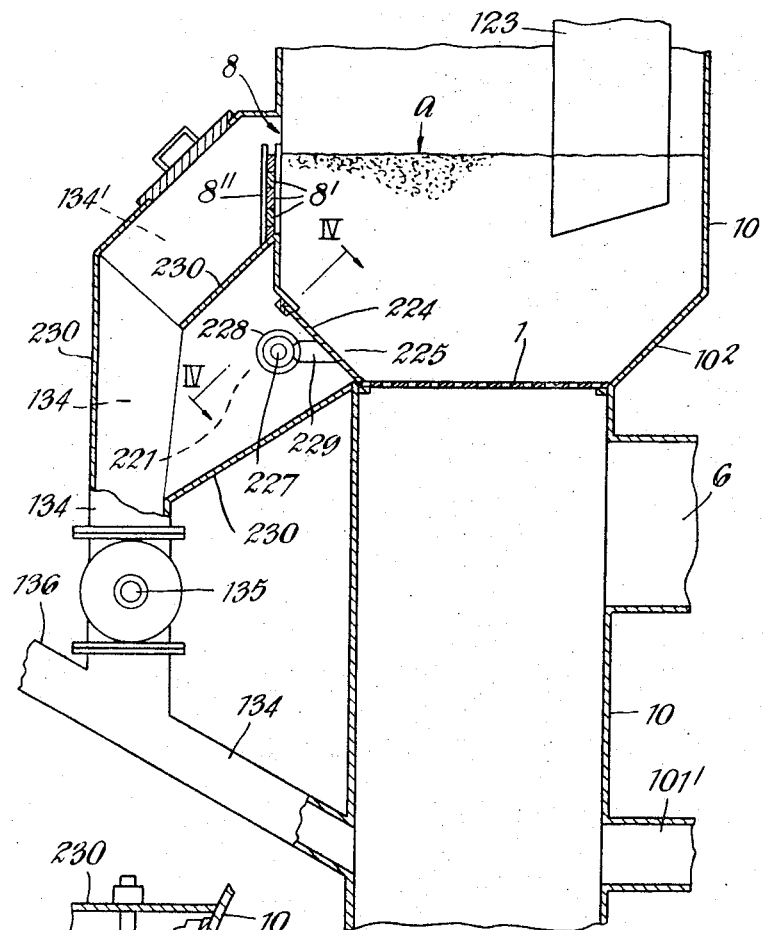
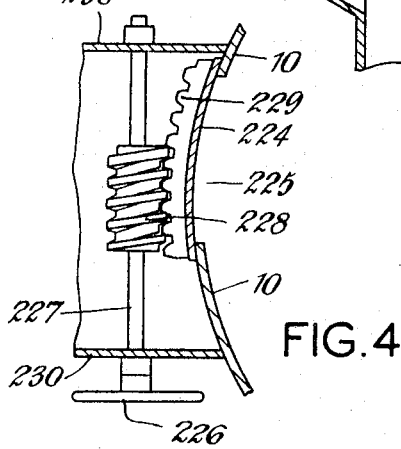
FIG. 3
FIG. 4

United States Patent Office 3,341,015
Patented Sept. 12, 1967

3,341,015
APPARATUS FOR THE SEPARATION OF PARTICULATE MATERIALS CONTAINING COMPONENTS OF DIFFERENT SPECIFIC GRAVITIES
Geoffrey Frank Eveson and George Thomas Richards, Sheffield, England, assignors to Head, Wrightson & Company Limited, Thornby-on-Tees, England
Filed Nov. 18, 1963, Ser. No. 324,411
8 Claims. (Cl. 209—474)

This invention concerns improvements relating to apparatus for the separation of small fine coal or other particulate material containing components of different specific gravities.

In the specifications belonging to our United States Patents No. 3,261,463 dated July 19, 1966 and 3,288,282 dated Nov. 29, 1966, we have described apparatus of the above nature wherein use is made of a fluidised bed for differentiating between the components of relatively high and low specific gravity of the material treated and thus effecting cleaning of the material. Reference is also made therein to the use of a fluidised bed in wholly or partly drying and de-dusting the material prior to treatment in the first-mentioned fluidised bed.

According to the present invention, an apparatus for the separation of small fine coal, or other particulate material, containing components of different specific gravities, comprises a vertical metal shell of circular, elliptical, square or other polygonal form in cross-section and made with open ends which are disposed normal to the axis of the shell, covers applied to the upper and lower ends of such shell, an inlet at the upper part of the shell for entry of material to be separated into the shell, an outlet at the lower end of the shell through which components of relatively high specific gravity emanating from the separation are discharged from the shell, a perforate support mounted within the shell for carrying a fluidised bed of discrete solid particles for the separation, an inlet to the shell, between top and bottom and below the level of the perforate support, for entry of gaseous medium under pressure to form and maintain the fluidised bed of discrete solid particles, and an outlet from the shell for a component of relatively low specific gravity discharged from the fluidised bed.

The apparatus may also comprise, mounted within the shell and at a situation above the top of the fluidised bed, a second perforate support on which material to be separated is wholly or partly dried and de-dusted, an inlet to the shell for entry of gaseous medium under pressure below the level of this second perforate support and above the first fluidised bed for the purpose of forming the said material into a fluidised bed and freeing it therein from moisture and dust, and means operative to receive material by overflow from the top of the second fluidised bed and deliver it to the first-mentioned fluidised bed.

The above forms of apparatus are of advantage for carrying out the process features of our earlier patent applications aforesaid, particularly in connection with the cleaning or drying and cleaning of coal.

Suitably, the shell has a lateral outlet at the top for the exit of the used gaseous medium and any small particles of solid material carried by such medium so that the latter may be led to apparatus for removal of such particles. In addition, the shell may have a lateral inlet, at a level above the first-mentioned perforate support, for use in connection with pulsing of the gaseous medium admitted below the level of the lower perforate support. This pulsing action results in the establishment of conditions in the fluidised bed of discrete solid particles such that the circulating motion of these particles, and any adverse influence of such motion on the precision with which material of relatively high specific gravity is separated within this fluidised bed from material of relatively low specific gravity, is controlled to some extent. This inlet is suitably the termination of a by-pass line through which gaseous medium is constrained to pass in a controlled, cyclic manner, thereby establishing pulsations in the mass flow rate of gas admitted below the said first-mentioned perforate support.

Figure 2:
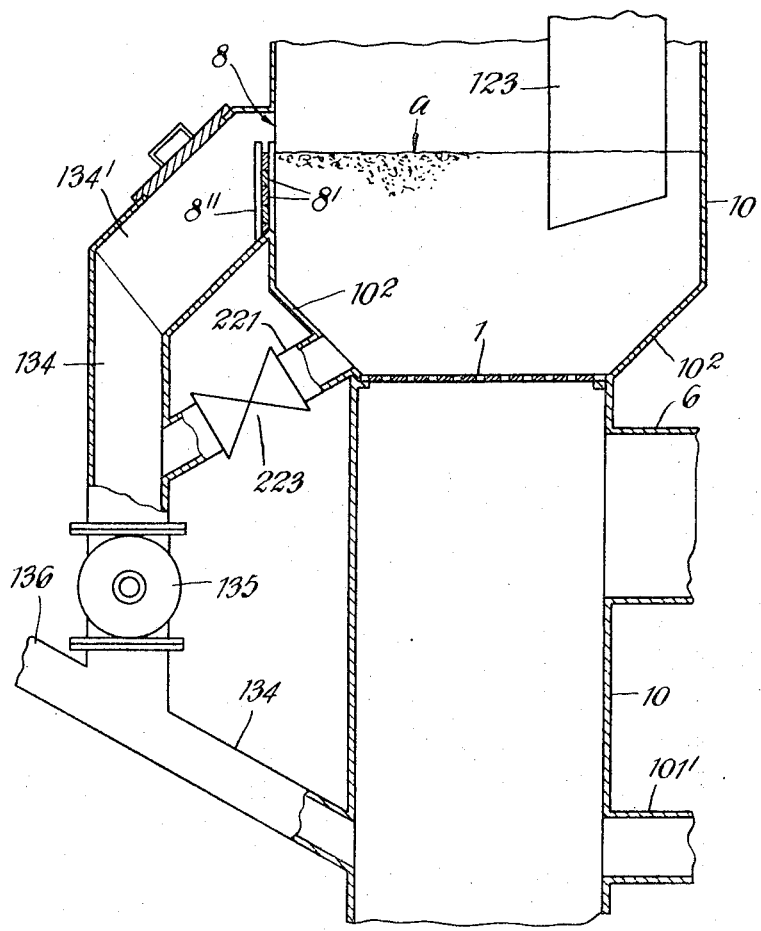

In order to enable the invention to be readily understood, reference is directed, by way of example, to the accompanying drawings in which:

FIGURE 1 is a perspective view, with parts broken away for illustrative purposes, of one construction of apparatus of the invention, FIGURES 2 and 3 show fragmentary sectional elevations, to a larger scale than FIGURE 1, illustrating modifications, and FIGURE 4 is a section on the line IV—IV of FIGURE 3.

The apparatus shown in FIGURE 1 comprises a shell 10 of cylindrical form and is intended for carrying out drying and de-dusting and subsequent dry cleaning of coal. An upper part of the shell, of smaller diameter than the lower part, contains a flat perforate metal support 1 for a fluidised bed of the raw coal. In this bed, moisture and dust are removed from the coal prior to treatment in another fluidised bed of discrete solid particles of another material set up on another perforate support 2 in the lower part of the shell. There is a horizontal annular ledge 144 between the upper and lower parts of the shell.

At top and bottom the shell is externally flanged or otherwise formed for the fitting of a cover 144a or 144b for each end of the shell which is originally open at its ends. The upper cover 144a has an inlet fitting 124 to one side of its centre for inlet of the raw coal, sized say ½″–0, to the upper perforate support. At the opposite side of the upper shell part to the inlet fitting, the shell 10 has an outlet opening 8 fitted in vertical grooved guide-bars 8″ at the sides with a slide or slats 8′ to constitute a weir for discharge by overflow of dried and de-dusted coal from the fluidised bed thereof formed on the upper perforate support 1. The weir is vertically adjustable by the slide or slats to suit the depth of the fluidised bed on such support.

The lower perforate support 2 is suitably of porous ceramic material or of sintered metal and of inverted conical form, and is intended for the dry-cleaning of the wholly or partly dried and de-dusted coal discharged from the upper fluidised bed. Its periphery is spaced from the inside wall of the lower part of the shell 10 and fitted with an upstanding cylindrical side wall 140, suitably of metal, to contain the sides of a fluidised bed of discrete particles which are of magnetite, ferro-silicon, galena, sand or other appropriate substance, all referred to herein for convenience as "magnetite." This fluidised bed would be of specific gravity intermediate between those of the relatively high and low density components of the dried and de-dusted coal to be dry-cleaned in such bed. To accommodate variable depth of this fluidised bed, the side construction or wall of the perforate support comprises an upper vertically adjustable cylindrical section or slide 141. Adjustment may be made by vertical rods 143, extending upwardly in the shell 10 from lugs 142 on opposite sides of such section and through glands in the aforesaid horizontal ledge 144. At the upper ends the rods are screw-threaded for engagement by a hand-wheel 146 bearing on a support 145 on the ledge.

The overflow coal from the upper fluidised bed is led to the lower fluidised cleaning bed from an outlet fitting 134' on the shell at the discharge outlet 8 from the shell for that overflow. This outlet fitting is extended as a sloping duct 134 to a rotary gas seal 135 from which a feed pipe part of 134 is directed at a downward inclination through a sealed opening in the side wall of the shell to a vertical end part 134a disposed centrally over the lower perforate support 2. A pipe 136 for supplying discrete magnetite particles used in forming the lower fluidised bed may be directed at a downward slope to the said feed pipe part of 134 at a point between the rotary gas seal 135 and the outside of the shell 10. For adjusting the inlet from the feed pipe 134 to the depth of such bed, according to the adjustment of the vertically adjustable side section 141 of the lower perforate support 2, the said vertical end part 134a of the feed pipe is fitted so as to terminate in a sleeve 137 slidable on said end part. Adjustment of the position, vertically, of the outlet from the feed pipe to the bed is suitably effected by rack teeth on the sleeve 137 and a companion pinion 138 on a horizontal spindle 139 extending to the outside of the shell 10 through a gas seal and fitted there with a hand-wheel (not shown). Preferably, the lower end of the sleeve 137 is kept immersed in the fluidised bed during coal cleaning in the bed.

Peripherally, the upstanding side wall 140, 141 of the lower perforate support 2 is surrounded by or formed with a launder 156 and the clean coal (accompanied by some magnetite) overflows into this launder outwardly from the fluidised bed over the full extent of the upper peripheral lip 155 of said side wall. The outer wall of the launder is formed by the inner wall of the shell 10 and the bottom of the launder slopes helically to an outlet fitting 157 for the clean coal on the lower part of the shell 10. The heavier component of the cleaning (accompanied also by some magnetite), passed from the lower fluidised bed through a down-pipe 9 extending from the apex of the inverted conical perforate support 2 of the bed. The down-pipe emerges from the shell through an outlet fitting or boss 9' on the lower cover 144b of the shell. The discharge of material at 157 and 9 would normally be led to apparatus for removal of the magnetite therefrom, as will be understood by those versed in the art.

Gaseous medium required for setting up and maintaining the fluidised beds is supplied to the shell at a main inlet fitting 6 on the side of the shell at a point just below the horizontal ledge 144 aforesaid and about midway between the two perforate supports, and at another inlet fitting 3 at the bottom of the shell just above the lower cover 144b of the shell. A further inlet fitting, not shown, may be provided a short distance below the apex of the inverted conical lower perforate support admission of gaseous medium to the down-pipe for a purpose indicated in the earlier United States Patent No. 3,261,463 aforesaid, or for the admission of a foam, an inert gas, for example, carbon dioxide, or any other suitable quenching agent. In addition, another inlet fitting 101' may be provided just below the main one 6, so that a variable but controlled proportion of the gaseous medium, flowing in the line 3 which enters the shell below the level of the lower perforate support 2, can be caused to by-pass the lower fluidised bed, as indicated by dot-and-dash and full lines at 101, and enter the shell above this bed. In this manner, the gaseous medium supplied to the lower fluidised bed can be pulsed in a cyclic, controlled fashion. This design follows that of the nature described in United States Patent No. 3,288,282 aforesaid. The parts shown at 101, 110, 111, 116 and 119 in the accompanying drawings represent one example of this design and correspond to similar parts shown, numbered and described in said patent application and reference is directed thereto for further explanation of same. Obviously, arrangements can be made so that by-passed gas enters the gas line which enters the shell at the main inlet 6, rather than having to provide a separate inlet fitting at 101' in the shell 10, for the by-passed gaseous medium. An appropriate pulsing unit for use at 116 is described in the earlier United States Patent No. 3,288,282 aforesaid and means for mounting it may be provided on the side wall of the shell.

At the upper end of the shell 10 is an outlet fitting 12 for dust-laden gaseous medium rising from the upper fluidised bed and, at suitable places on its sides, the shell may be fitted with brackets, as at 10", for mounting it on appropriate supporting structure.

For safety purposes, a bursting disc 220 may be fitted in the upper cover 144a of the shell 10 and fittings 221 and 222 at the side of the shell. The one 221 of such fittings is situated just above the level of the upper perforate support and slopes downwardly from the shell. As shown in FIGURE 2, it would be fitted with a gate valve 223 for control purposes. Or, alternatively, and as shown in FIGURES 3 and 4, a gate 224 may be used at an aperture 225 in the wall of the shell 10 and operated manually from a hand-wheel 226 through a spindle 227, worm 228 and rack 229. This gate is provided with a housing 230 simulating the fitting 221, the outlet fitting 134' and the upper part of the pipe 134, each indicated by its dotted leading-line. Either form adopted for the fitting 221 may be used for removing the majority of the particles from the upper fluidised bed a if this practice should be necessary, e.g. at the end of a working shift, or for purposes of maintaining or repairing certain sections of the fluidising vessel, or if the particles in the upper fluidised bed ignite. Either form may also be used periodically to remove, from the upper bed a, large or dense particles which may not be fluidised by the gaseous medium and which would, therefore, tend to accumulate on the upper perforate support 1. It is convenient to arrange for either form of the fitting 221 to discharge into the duct 134 above the rotary gas seal 135. In both FIGURE 2 and FIGURE 3, the shell sides are shown frusto-conically enlarged at $10^2$ to facilitate the arrangement of the fitting 221. The other 222 of said fittings, which again would be furnished with a valve (not shown), is situated above the level of the upper fluidised bed (as seen in FIGURE 1), its purpose being to provide for admission of water, a foam, an inert gas, for example, carbon dioxide, or any other suitable quenching agent, to such bed if its particles ignite or if, for any reason, it becomes necessary rapidly to quench the material in the upper fluidised bed. Suitably, the shell 10 and the hot gas inlets 3, 6 and 101' and the lines leading thereto would be lagged with heat-insulating material.

Practically, the shell and the various inlet and outlet fittings and brackets may be of welded construction or assembly, with flanges welded on where connections are to be made with outside sources of gaseous medium or magnetite, or with devices for further treatment of the coal and waste material discharged from the shell.

The invention is not restricted to the particular constructions above described because modifications are possible as will be apparent from a consideration of the earlier applications aforesaid. For example, the shell, which constitutes a fluidising vessel within the meaning of those earlier applications may be made to have one or more than two perforate supports and may be duplicated where more than one fluidising vessel is employed as indicated in said applications.

A construction is also possible in which a number of fluidised beds of magnetite are arranged side by side but associated with only one upper (drying and de-dusting) fluidised bed, the whole assembly of fluidised beds being within one shell.

According to a further construction, both drying and de-dusting and cleaning stages may be adapted for overflow of the floating product of the fluidised beds to take place over the whole, or substantially the whole, extent of the periphery of an overflow edge at the top of the bed.

Moreover, various features of our concurrent pending patent application Ser. No. 324,448 may be incorporated in the shell construction and equipment of the present invention where applicable.

Useful advantages of the invention include:

(a) A compact form of apparatus is possible in which the essential operations of drying and cleaning can both be performed.

(b) Dry cleaning and de-dusting may be achieved whilst creating a dust problem, and attendant health hazard, of minimum magnitude.

(c) Ease of control of specific gravity of separation, of the degree of drying of the raw feed and of the particle size at which the raw feed is de-dusted.

(d) Maximum economy in the use of heat and of air is achieveable by arranging the upper and lower fluidised beds in series in the shell.

(e) If the raw feed has a surface moisture content sufficently low to enable it, without further drying, to be de-dusted and to be cleaned in the fluidised bed of magnetite, the hot gaseous medium supply to the apparatus may be replaced by cold or ambient air. De-dusting may be omitted if no material, or very little material, finer than, say 0.5 mm. is present in the raw feed, but it may still be necessary to dry such a feed, using hot gaseous medium, before it is admitted to the cleaning stage.

We claim:

1. Fluidised bed apparatus for the separation of small fine coal, or other particulate material containing components of different specific gravities, comprising a vertical shell having an inlet at its upper part for entry of material to be separated into the shell, an outlet at its lower part through which components of relatively high specific gravity emanating from the separation are discharged from the shell, and a further outlet through which components of relatively low specific gravity emanating from the separation are discharged from the shell, a perforate support mounted within said shell for carrying a fluidised bed of discrete solid particles, said perforate support comprising a body of porous material whose pores constitute the perforations of said support, said perforate support being of inverted cone shape and having an aperture at the apex thereof for the discharge of said components of high specific gravity from said support, and means for supplying fluidised medium under pressure to the underside of said support whereby to form and maintain said fluidised bed.

2. Fluidised bed apparatus for the separation of small fine coal, or other particulate material containing components of different specific gravities, comprising a vertical shell having an inlet at its upper part for entry of material to be separated into the shell, an outlet at its lower part through which components of relatively high specific gravity emanating from the separation are discharged from the shell and a further outlet through which components of relatively low specific gravity emanating from the separation are discharged from the shell, a first perforate support mounted within said shell and disposed to receive the material fed through said inlet and enabling said material to be formed into a fluidised bed, a second perforate support mounted within said shell at a situation below said first perforate support for carrying a fluidised bed of discrete solid particles, transfer means operative to receive material over-flowing from said first perforate support and deliver it to said second perforate support, gas supply means for supplying gaseous fluidising medium under pressure to the underside of said second perforate support whereby to form and maintain the fluidising beds on said first and second perforate supports, a by-pass line extending from said gas supply means to the shell at a point above said second perforate support for admitting gaseous medium immediately below said first perforate support and control means in said by-pass line to constrain the gaseous medium to enter the shell in a controlled cyclic manner, thereby establishing pulsations in the flow of gaseous medium to beneath said second perforate support.

3. Fluidised bed apparatus for the separation of small fine coal, or other particulate material containing components of different specific gravities, comprising a vertical shell having an inlet at its upper part for entry of material to be separated into the shell, an outlet at its lower part through which components of relatively high specific gravity emanating from the separation are discharged from the shell and a further outlet through which components of relatively low specific gravity emanating from the separation are discharged from the shell, a perforate support mounted within said shell for carrying a fluidised bed of discrete solid particles, said perforate support being of inverted conical form and having a central outlet therein for the discharge of said components of high specific gravity from said support, a vertical cylindrical side wall for enclosing the fluidised bed formed on said perforate support, said side wall being spaced from the inside wall of said shell and having an upper vertically adjustable section to accommodate variable depth of the fluidised bed, and gas supply means for supplying gaseous fluidising medium under pressure to the underside of said perforate support whereby to form and maintain said fluidised bed.

4. Fluidised bed apparatus for the separation of small fine coal, or other particulate material containing components of different specific gravities, comprising a vertical cylindrical shell having an inlet at its upper part for entry of material to be separated into the shell, an outlet at its lower part through which components of relatively high specific gravity emanating from the separation are discharged from the shell, end and a further outlet through which components of relatively low specific gravity emanating from the separation are discharged from the shell, a first perforate support mounted within said upper part of said shell, which upper part is of smaller diameter than said lower part, said first perforate support being disposed to receive the material fed through said inlet and enabling said material to be formed into a fluidised bed, a second perforate support mounted within said lower part of said shell for carrying a fluidised bed of discrete solid particles, transfer means operative to receive material overflowing from said first perforate support and deliver it to said second perforate support, said transfer means comprising a duct fitted with a rotary gas seal and extending from an outlet in the upper part of said shell externally of said shell and then entering the lower part of the shell to extending centrally above the fluidised bed on said second perforate support, a vertically adjustable weir fitted in said outlet in the upper part of said shell leading to said transfer means, and gas supply means for supplying gaseous fluidising medium under pressure to the underside of said second perforate support whereby to form and maintain the fluidised beds on said first and second perforate supports.

5. Apparatus according to claim 4, wherein the lower end of said duct is vertical and fitted with a slidable sleeve adjustable vertically thereon in relation to the fluidised bed on said second perforate support.

6. Apparatus according to claim 3, wherein a launder is provided around the vertical side wall of said perforate support to receive separated low density material which overflows from the fluidised bed on such support outwardly over substantially the full extent of the upper peripheral edge of such side wall.

7. Apparatus according to claim 3, wherein a downpipe for discharge of relatively high density separated material is extended from the apex of the inverted conical perforate support and emerges from the shell through an outlet in a lower cover of the shell.

8. Apparatus according to claim 3 wherein said perforate support comprises a body of porous material whose pores constitute the perforations of said support.

References Cited
UNITED STATES PATENTS

| | | | |
|---|---|---|---|
| 2,311,954 | 2/1943 | McLean | 209—139 X |
| 2,396,036 | 3/1946 | Blanding | 209—474 |
| 2,586,818 | 2/1952 | Harms | 209—138 X |
| 3,079,222 | 2/1963 | Reeve | 34—57 X |

HARRY B. THORNTON, *Primary Examiner.*

L. H. EATHERTON, *Assistant Examiner.*